United States Patent

Nonogaki et al.

Patent Number: 5,913,053
Date of Patent: Jun. 15, 1999

[54] SYNCHRONOUS CONTROLLER FOR SYNCHRONOUSLY OPERATING A PLURALITY OF ACTUATORS

[75] Inventors: Hideyuki Nonogaki; Koji Eba, both of Niwa-gun, Japan

[73] Assignee: Okuma Corporation, Nagoya, Japan

[21] Appl. No.: 08/923,962

[22] Filed: Sep. 5, 1997

[30] Foreign Application Priority Data

Sep. 11, 1996 [JP] Japan .................................. 8-240197

[51] Int. Cl.⁶ .................................................. G06F 19/00
[52] U.S. Cl. .......................................................... 395/551
[58] Field of Search ..................................... 395/551, 555, 395/733; 360/70

[56] References Cited

U.S. PATENT DOCUMENTS 5,381,341  1/1995  Herrala et al. ..................... 364/471.03
5,771,174  6/1998  Spinner et al. ..................... 364/471.03
5,781,398  7/1998  Fenske et al. .......................... 361/171

*Primary Examiner*—Thomas M. Heckler
*Attorney, Agent, or Firm*—Oliff & Berridge, PLC

[57] ABSTRACT

A synchronous controller includes a command controller for outputting action commands to actuator controllers for synchronously controlling respective corresponding actuators. Each actuator controller includes an interrupt controller and a corresponding internal counter. One interrupt controller is designated as a master and the remaining interrupt controllers are designated as slaves. The master interrupt controller activates an interrupt signal on a bus based on the count value of its corresponding internal counter and resets the counter while the slave interrupt controllers concurrently reset their corresponding internal counters upon detecting the interrupt signal on the bus.

4 Claims, 6 Drawing Sheets

SYNCHRONOUS CONTROLLER FOR SYNCHRONOUSLY OPERATING A PLURALITY OF ACTUATORS

BACKGROUND OF THE INVENTION

1. Field of the Invention

The present invention relates to synchronous controller for synchronously operating a plurality of actuators.

2. Description of the Related Art

A block diagram and a timing chart showing an example of conventional synchronous control equipment connecting a command controller and an actuator controller with a general purpose bus are shown in FIG. 5 and FIG. 6. The set cycle value, the initial count value, the set cycle values 1 and 2, and the output cycle values 1 and 2 shown in the timing chart of FIG. 6 are predetermined values necessary for control of the synchronous control device. In this synchronous control equipment, counter 22 in main controller 4, counter 22a in actuator controller 2a, and counter 22b in actuator controller 2b are incremented by clock pulses output from a clock generator 14.

The procedure for performing synchronous actuator operation begins at timing t1 in the timing chart of FIG. 6. A signal is output from counter synchronous controller 43 to count setters 23a, 23b of actuator controllers 2a, 2b via IF converter 42 and exclusive IF 41. Counters 22a, 22b are reset to the initial count value by this signal. At this time, counter synchronous controller 43 also resets counter 22 in a similar way. Counters 22, 22a, and 22b are set to the same value by this operation. In addition, because these counters 22, 22a, and 22b are incremented by the same clock pulses output from clock generator 14, the count values of these counters always coincide. At the same timing t1, action command controller 12 of main controller 4 successively outputs a command A for actuator controller 2a and a command B for actuator controller 2b, which are sent via general purpose bus Ifs 15 and 17, and IF converter 42.

At timing t2, action controller 21a receives action command A and begins to calculate action signal A' to be output to actuator 3a, taking into consideration signals such as position data and velocity data detected by detector 4a. Similarly, at timing t3, action controller 21b receives action command B and begins to calculate action signal B' to be output to actuator 3b, taking into consideration signals such as position data and velocity data detected by detector 4b. At timing t4, at which point counter 22a has reached output cycle value 1, action controller 21a outputs action signal A' calculated before to actuator 3a. At this time, counter 22b shows the same output cycle value 1 as counter 22a because both counters have been set at timing t1. At timing t4, action controller 21b outputs previously calculated action signal B' to actuator 3b in a similar manner as action controller 21a. At timing t10 in the timing chart of FIG. 6, at which counter 22 has reached set cycle value 1, action command controller 12 outputs action commands C and D, and action controllers 21a and 21b calculate action signals C' and D' to be output to actuators 3a and 3b. When counters 22a and 22b have reached output cycle value 2, action controller 21a outputs action signal C' calculated before to actuator 3a, and action controller 21b outputs action signal D' to actuator 3b. Similarly, after timing t20 in the timing chart of FIG. 6, at which counter 22 has reached set cycle value 2, action controllers 21a and 21b can periodically receive action commands because count values of counters 22, 22a, and 22b are the same, and further can periodically and simultaneously output action signals to actuators 3a and 3b. Thus, synchronous operation of the respective actuators become possible.

As described above, in conventional synchronous control equipment in which a command controller is connected to an actuator controller with a general purpose bus, high frequency clock pulses are supplied to a plurality of actuator controllers. Consequently, when a large number of actuator controllers are to be connected, waveform distortion due to increase of load capacity of clock pulses, reflection of signals, etc. are generated. This may then result in equipment error due to counter malfunction. In addition, because connection by a signal line having high driving ability is necessary for preventing the malfunction, connection by exclusive IF is required. Further, even in the case of the connection by exclusive IF, it is not easy to connect additional actuators because the number of connections is limited.

SUMMARY OF THE INVENTION

An object of the present invention is to solve the above and other problems by providing a synchronous controller in which a command controller can be connected to an actuator controller with a general purpose bus, which suppress errors due to counter malfunction, and which can easily achieve additional connections of actuators for synchronous operations.

The synchronous control device related to the present invention comprises a plurality of actuator controllers for synchronously controlling respective corresponding actuators, a command controller for outputting an action command to the actuator controllers, and an interrupt controller having a synchronization function through resetting an internal counter of the actuator controller. The actuator controllers and the command controller are connected with general purpose buses and interrupt signals of the general purpose buses are used in the actuator controllers.

In order to achieve synchronous operations of the actuators, the synchronous controller of the present invention connects the command controller and the actuator controllers with general purpose buses and conducts synchronous operations of the counters by freshly resetting the internal counters of the respective actuator controllers using interrupt signals in the general purpose buses having a frequency lower than that of the clock signals so as not to be significantly affected by waveform distortion. Therefore, errors due to counter malfunction can be prevented, even if the number of connected actuators is increased, and additional connections to the actuators can easily be made.

DESCRIPTION OF THE PREFERRED EMBODIMENTS

Figure 1:
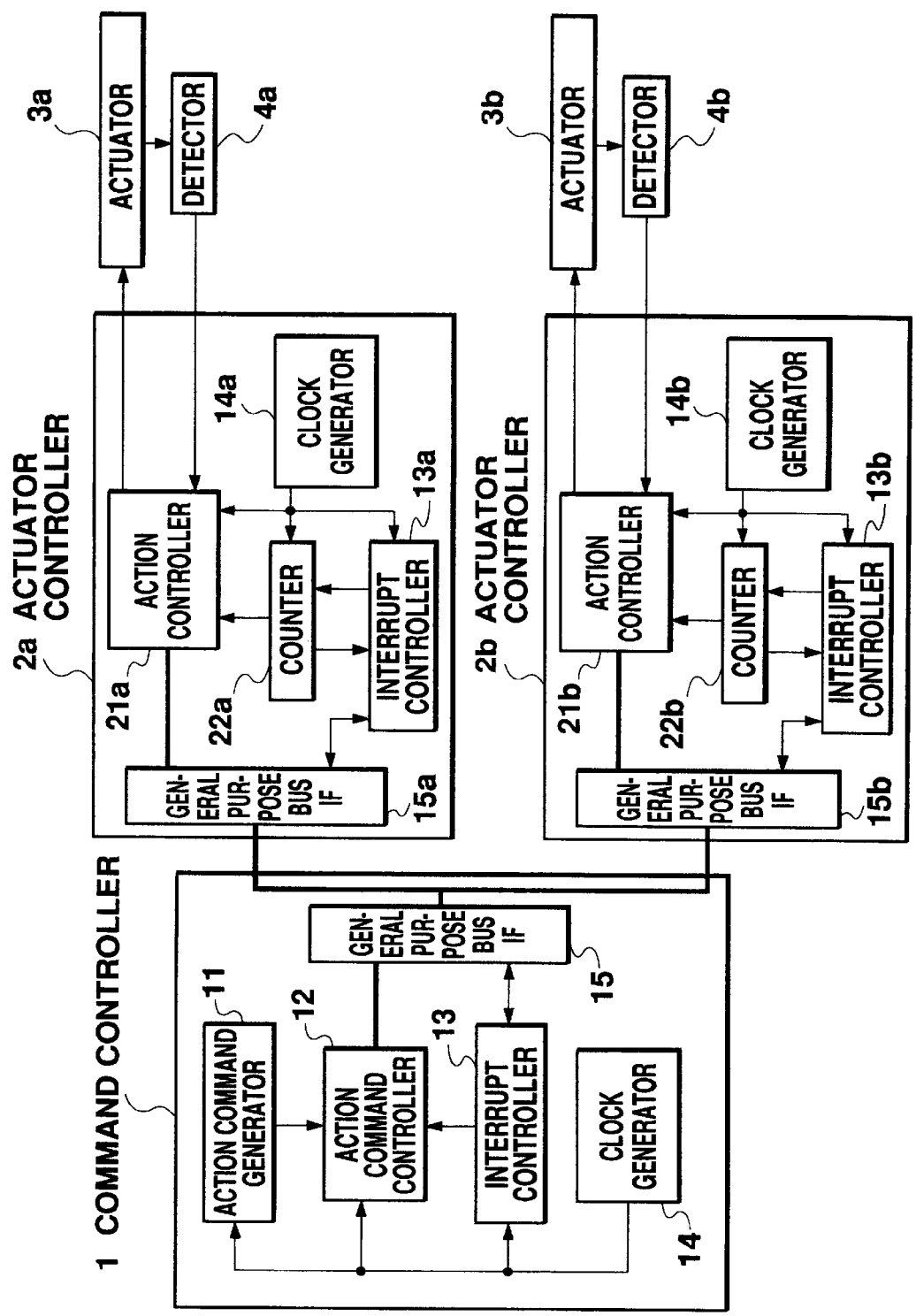
FIG. 1 is a block diagram showing a first embodiment of a synchronous controller of the present invention.
Figure 2:
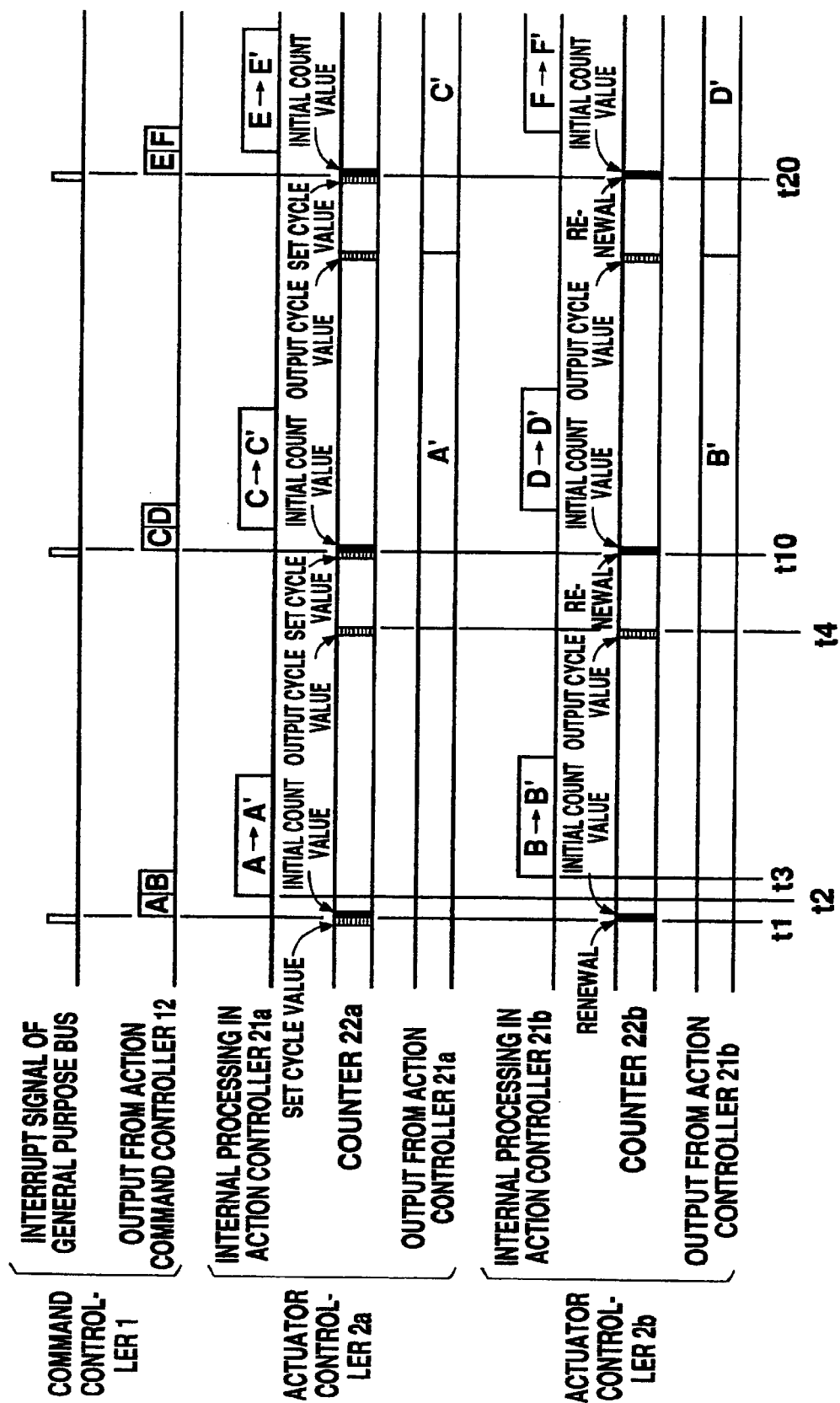
FIG. 2 is a timing chart explaining the operation of the synchronous controller shown in FIG. 1.
Figure 5:
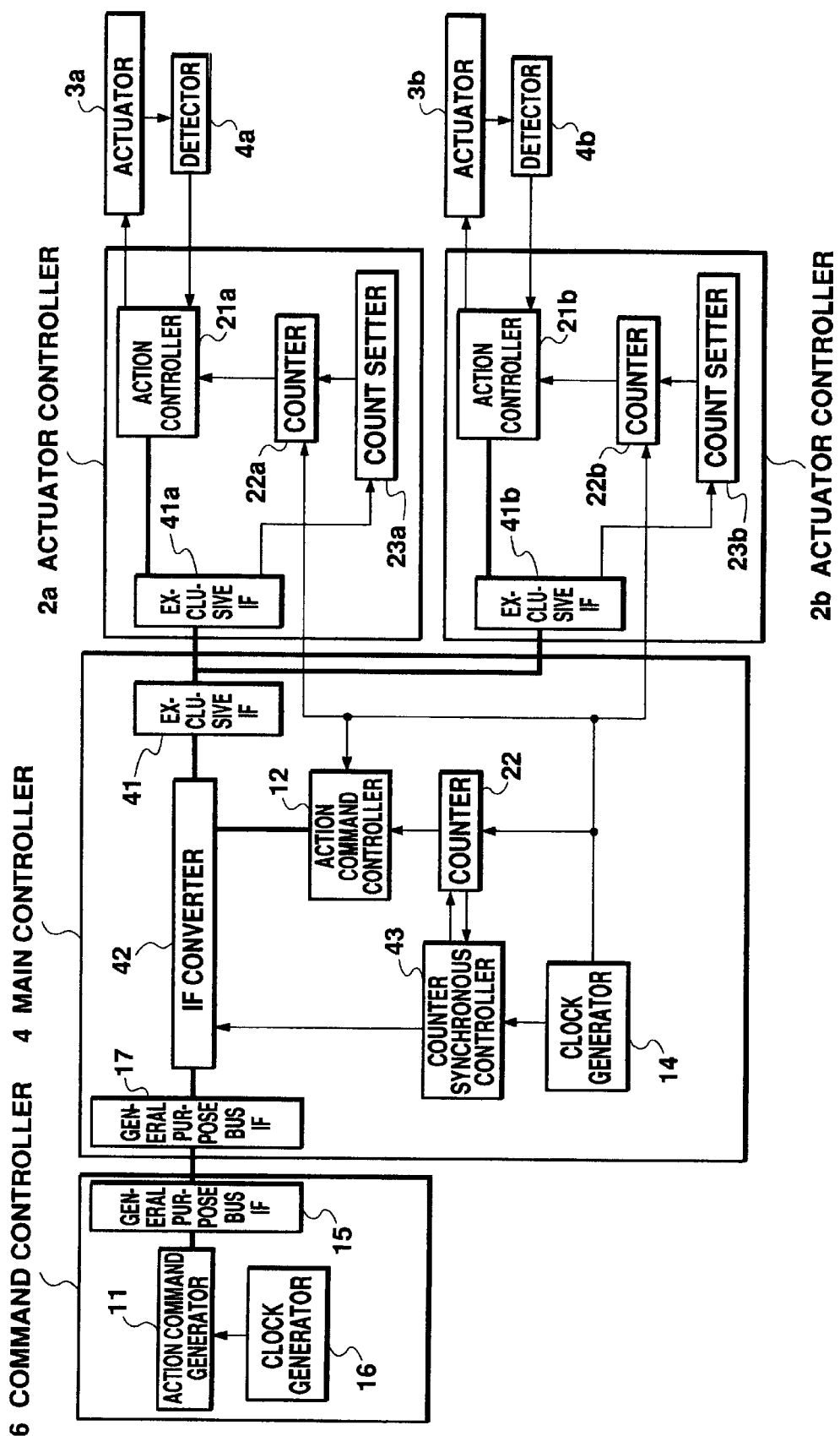
FIG. 5 is a block diagram showing an example of conventional synchronous control equipment.
Figure 6:
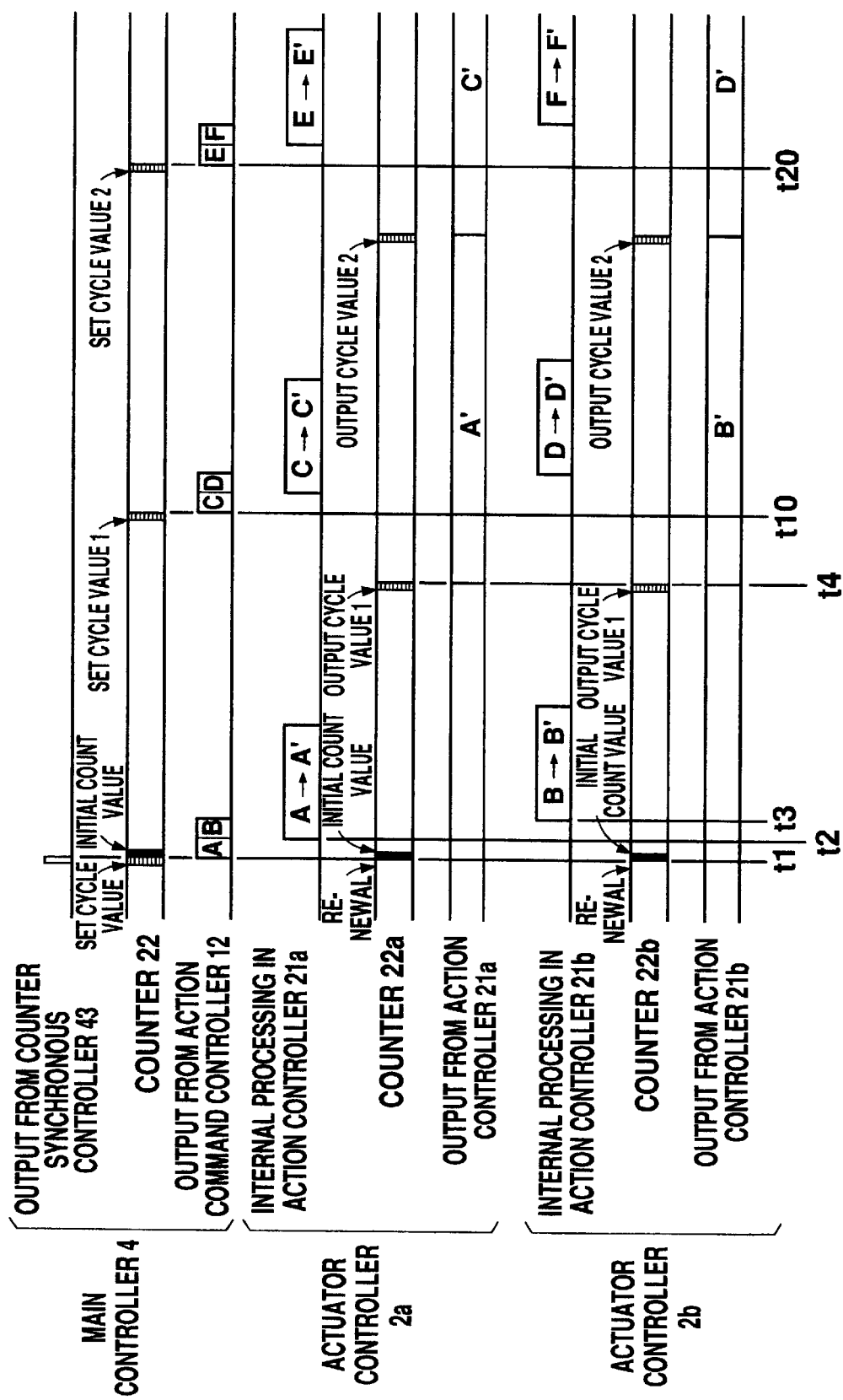
FIG. 6 is a timing chart for explaining the operation of the block diagram shown in FIG. 5.

FIG. 1 is a block diagram showing an embodiment of the synchronous controller of the present invention, in which a command controller is connected to an actuator controller with general purpose buses. FIG. 2 is a timing chart showing the operation of the present embodiment. Explanations for corresponding notation as used in FIGS. 5 and 6 will not be repeated here.

The set cycle value, the initial count value, and the output cycle values shown in the timing chart of FIG. 2 are predetermined values necessary for performing control of the synchronous controller. Actuator controller 2a in the synchronous controller of the present embodiment consists of general purpose bus IF 15a, action controller 21a, counter 22a, clock generator 14a, and interrupt controller 13a, as shown in FIG. 1. Similarly, actuator controller 2b consists of general purpose bus IF 15b, action controller 21b, counter 22b, clock generator 14b, and interrupt controller 13b. Clock generators 14a and 14b are set so as to output identical frequency clock signals.

The functions of interrupt controllers 13a and 13b include those of a master for outputting interrupt signals, which are internal signals in the general purpose buses, to general purpose bus IF 15a or 15b when connected counter 22a or 22b has reached the arbitrarily set values; slave functions for detecting the receiving of the interrupt signals when the interrupt signals are input from general purpose bus IFs 15a and 15b; and switching functions between the respective functions. In the example shown in FIG. 2, interrupt controller 13a of actuator controller 2a serves as a master for outputting the interrupt signals by setting of a switch, software, etc., and another interrupt controller 13b serves as a slave for detecting the received interrupt signals.

Procedures for synchronous operations of the actuators will now be described. Interrupt controller 13a, set beforehand as a master at timing t1 in the timing chart of FIG. 2, outputs an interrupt signal to general purpose bus IFs 15 and 15b when the count value of connected counter 22a has reached the set cycle value. Because interrupt controller 13b of actuator controller 2b is set beforehand so as to serve as a slave, the count value of counter 22b is reset to an initial count value when interrupt controller 13b receives the interrupt signal output from the interrupt controller 13a. Similarly, interrupt controller 13a simultaneously resets the count value of counter 22a to an initial count value. In addition, interrupt controller 13 of command controller 1 outputs the detected signal of the receiving of the interrupt signal to action command controller 12 when the interrupt signal is input, and action command controller 12 successively outputs action commands A and B received from action command generator 11. At timing t2, action controller 21a of actuator controller 2a receives action command A and begins to calculate action signal A' to be output to actuator 3a taking into consideration signals such as position data and velocity data detected by detector 4a.

At timing t3, action controller 21b receives action command B and begins to calculate action signal B' to be output to actuator 3b taking into consideration signals, such as position data and velocity data, detected by detector 4b.

At timing t4, at which stage counter 22a has reached the output cycle value, action controller 21a outputs previously calculated action signal A' to actuator 3a. At this time, counter 22b has the same value as counter 22a because both counters 22b and 22a were set at timing t1 and incremented by the clock signals of the same frequency generated by different clock generators 14a and 14b. Therefore, count values of both counters 22a and 22b reach the output cycle value almost simultaneously, with only a slight error, and action controller 21b outputs previously calculated action signal B' to actuator 3b similarly to action controller 21a.

At timing t10, counter 22a reaches the set cycle value. After that, action controllers 21a and 21b can periodically receive action commands by repeating the operating cycles from t1 to t4, and can periodically and simultaneously output action signals to actuators 3a and 3b, because count values of counters 22a and 22b coincide. Consequently, synchronous operation of the actuators becomes possible.

Count values are reset to compensate for accumulated errors in counters 22a and 22b, caused by errors contained in the clock pulses output from clock generators 14a and 14b. Resetting should therefore be done periodically at an interval that does not disturb the synchronous operation of the actuators.

Figure 3:
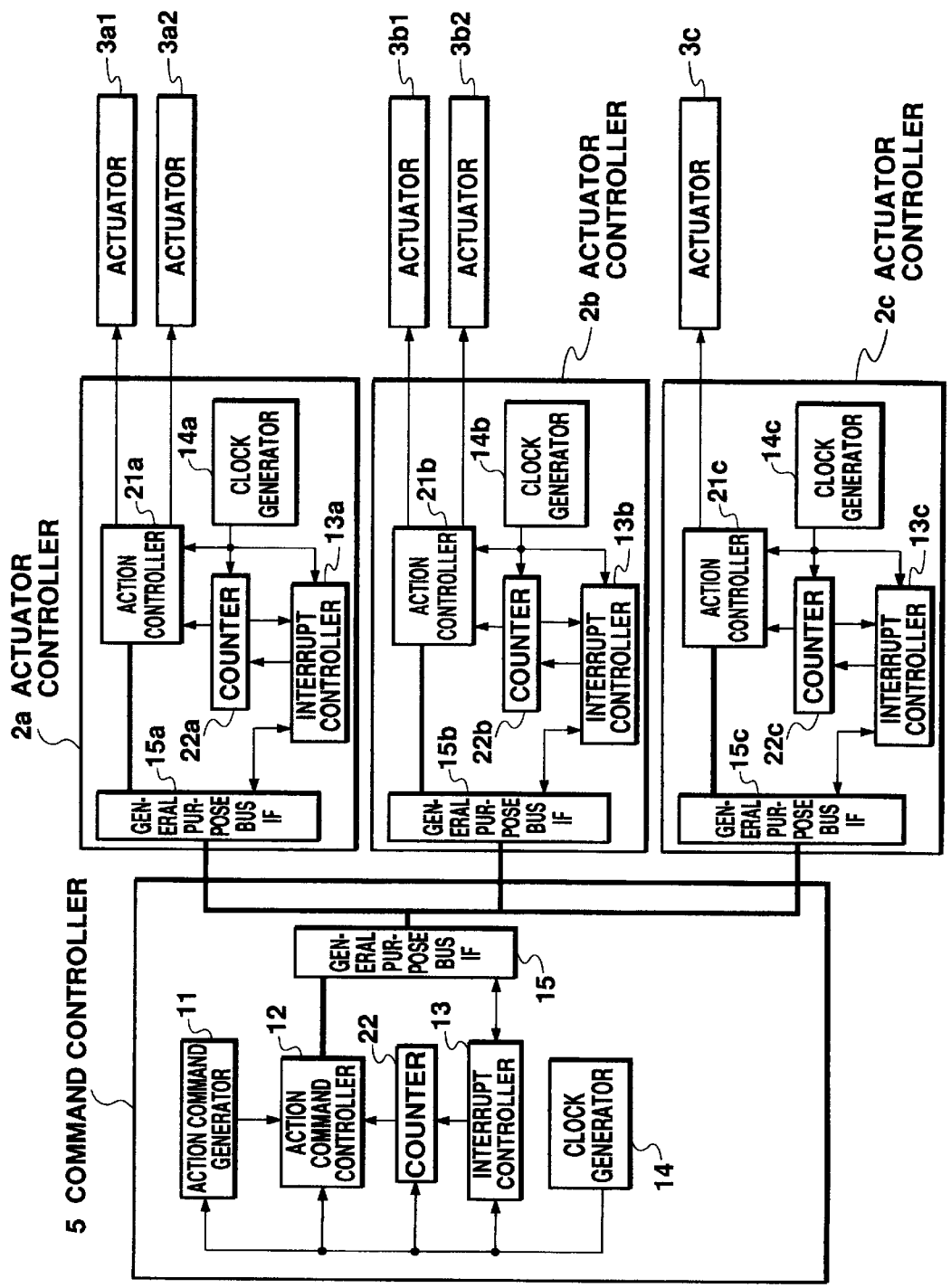
FIG. 3 is a block diagram showing another embodiment of a synchronous controller according to the present invention.

FIG. 3 is a block diagram showing another embodiment of the synchronous controller of the present invention, in which a command controller is connected to an actuator controller with general purpose buses.

Figure 4:
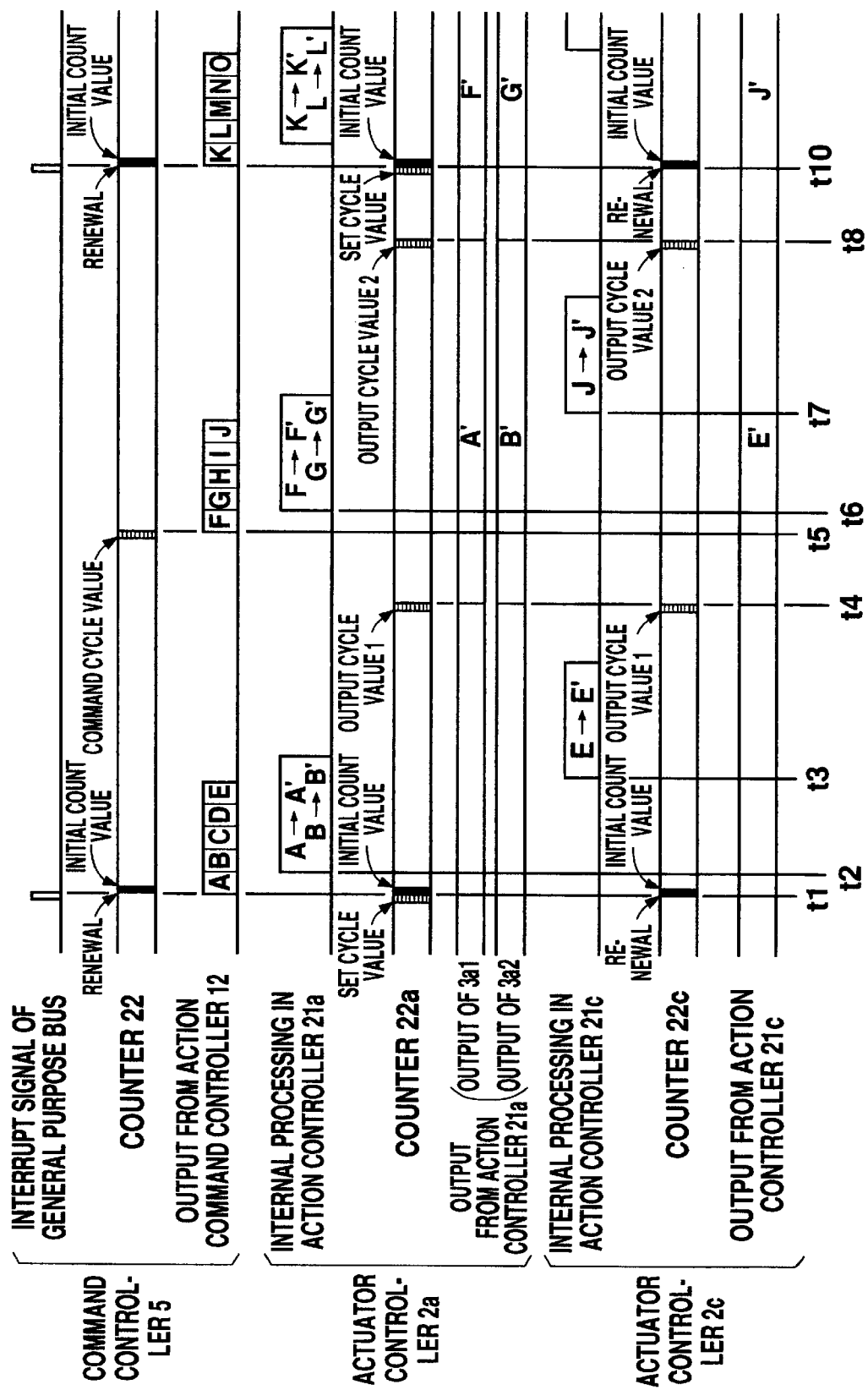
FIG. 4 is a timing chart explaining the operation of the synchronous controller shown in FIG. 3.

FIG. 4 is a timing chart showing part of the operation of the present embodiment. The present embodiment shows a configuration of the synchronous controller in which actuator controllers 2a and 2b, which can be connected to two actuators, and actuator controller 2c, which can be connected to one actuator, are connected to command controller 5, allowing these five actuators to be synchronously operated. Clock generators 14, 14a, 14b, and 14c are set so as to output clock signals of the same frequency. Set cycle values, initial count values, command cycle values, and output cycle values 1, 2 shown in the timing chart of FIG. 4 show the predetermined numerical values for operation of the synchronous controller. Counter 22 is provided inside command controller 5 of the present embodiment. A control method differing from that of the embodiment shown FIG. 1 becomes possible by the inclusion of counter 22, as will now be described.

FIG. 4 shows a timing chart of actuator controller 2a comprising interrupt controller 13a serving as a master, and a timing chart of actuator controller 2c comprising interrupt controller 13c serving as a slave, similarly to the first embodiment. Interrupt controller 13b of actuator controller 2b serves as a slave similarly to the embodiment shown in FIG. 2, but not shown in FIG. 4. At timing t1 in the timing chart of FIG. 4, the count value of counter 22 in command controller 5 as well as those of counters 22b, 22c are reset to an initial count value, when interrupt controllers 13, 13b, and 13c receive the interrupt signal output from interrupt controller 13a. In addition, at this timing t1, action command controller 12 successively outputs action commands A~E, which have been sent from action command generator 11 for actuators 3a1~3c. At timing t2~t3, action controllers 21a~21c receive action commands A~E, and begin to calculate respective action signals A'~E'.

At timing t4, action signals A'~E' are output to respective actuators 3a1~3c. As all counters 22a~22c have been reset to an initial count value at timing t1 and have almost simultaneously reached output cycle value 1 by being incremented by the clock signal having the same frequency. Even though clock generators 14a, 14b, and 14c are different, action signals A'~E' can be output at the same time.

At timing t5, at which point counter 22 reaches the command cycle value, action command controller 12 successively outputs action commands F~J, sent from action command generator 11, to actuators 3a1~3c. At timing t6 and t7, action controllers 21a~21c receive action commands F~J, and begin to calculate respective action signals F'~J'. At timing t8 in the timing chart, at which point counters 22a~22c have reached output cycle value 2, previously calculated action signals F'~J' are output to respective actuators 3a1~3c.

At timing t10, counter 22*a* reaches the set cycle value. After that, action controllers 21*a*~21*c* can periodically receive action commands by repeating the operating cycles from t1~t8, and can continuously and simultaneously output action signals to actuators 3*a*1~3*c*, because count values of counters 22*a*~22*c* coincide with each other within an error range which does not effect synchronous operation. Thus, synchronous operation of the actuators becomes possible. In the present embodiment, action commands are output twice within the interval of the set cycle values, that is, the interval between timing t1 and timing t10. It is also possible to change the number of outputting action commands within the interval of the set cycle values by changing the respective cycle values.

As described above, according to the synchronous controller of the present invention in which the command controller is connected to the actuator controllers with general purpose bus IFs, additional actuators for performing synchronous operation by connecting actuator controllers to general purpose bus IFs can easily be connected and steady synchronous operation of actuators can be realized by preventing the occurrence of errors due to counter malfunction, even when the number of connected actuators is increased, because a synchronizing function to renew setting of an internal counter of an actuator controller is given by providing a general purpose bus IF and using an interrupt signal inside that general purpose bus IF.

What is claimed is:

1. A synchronous controller comprising:

a plurality of actuator controllers that synchronously control respective corresponding actuators, each of the plurality of actuator controllers comprising an internal counter;

an interrupt controller that generates interrupt signals and controls the operation of said internal counters;

a command controller that outputs an action command to at least one of said plurality of actuator controllers; and general purpose bus means interconnecting said plurality of actuator controllers and said command controller;

wherein said interrupt controller outputs an interrupt signal on said general purpose bus means and synchronizes said internal counters.

2. The synchronous controller according to claim 1, wherein one interrupt controller provided in one actuator controller operates as a master, and the other interrupt controllers provided in the other actuator controllers operate as slaves.

3. A synchronous controller comprising:

a plurality of actuator controllers that synchronously control respective corresponding actuators, each of the plurality of actuator controllers comprising:
an internal counter; and
an interrupt controller that outputs and detects interrupt signals and controls the operation of said internal counter;

a command controller that outputs an action command to at least one of said plurality of actuator controllers, said command controller comprising:
an internal counter; and
an interrupt controller that outputs and detects interrupt signals and controls the operation of said internal counter; and general purpose bus means interconnecting said plurality of actuator controllers and said command controller;

wherein one of said interrupt controllers outputs an interrupt signal to said general purpose bus means, the remaining interrupt controllers detect said interrupt signal on said bus means, and each interrupt controller synchronizes a corresponding internal counter based on said interrupt signal.

4. The synchronous controller according to claim 3, wherein one interrupt controller in one actuator controller operates as a master, and the other interrupt controllers provided in the other actuator controllers and the command controller operate as slaves.

* * * * *